Figure 1:
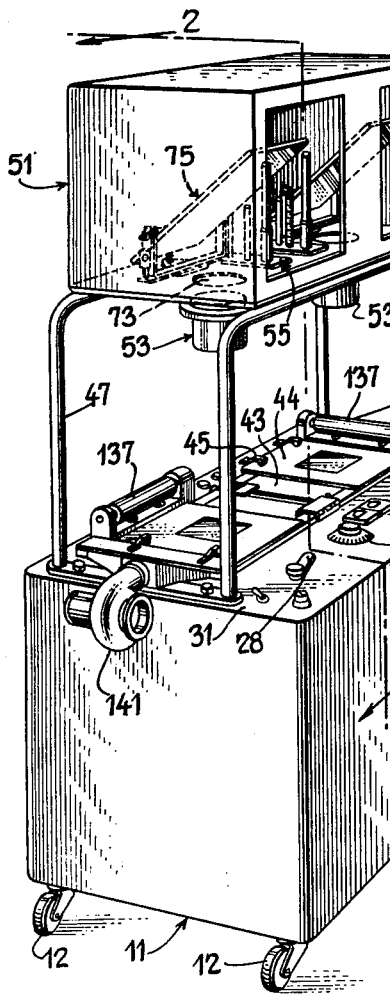

July 12, 1960     T. B. HOWELL ET AL     2,944,461
PROJECTION EQUIPMENT

Filed Feb. 18, 1957     4 Sheets-Sheet 1

INVENTORS
THOMAS B. HOWELL.
MILTON ROGIN.
BY
Dean, Fairbank & Hirsch
ATTORNEY

July 12, 1960

T. B. HOWELL ET AL 2,944,461

PROJECTION EQUIPMENT

Filed Feb. 18, 1957

4 Sheets-Sheet 2

INVENTORS.
THOMAS B. HOWELL.
MILTON ROGIN.
BY
Dean, Fairbank & Hirsch
ATTORNEY

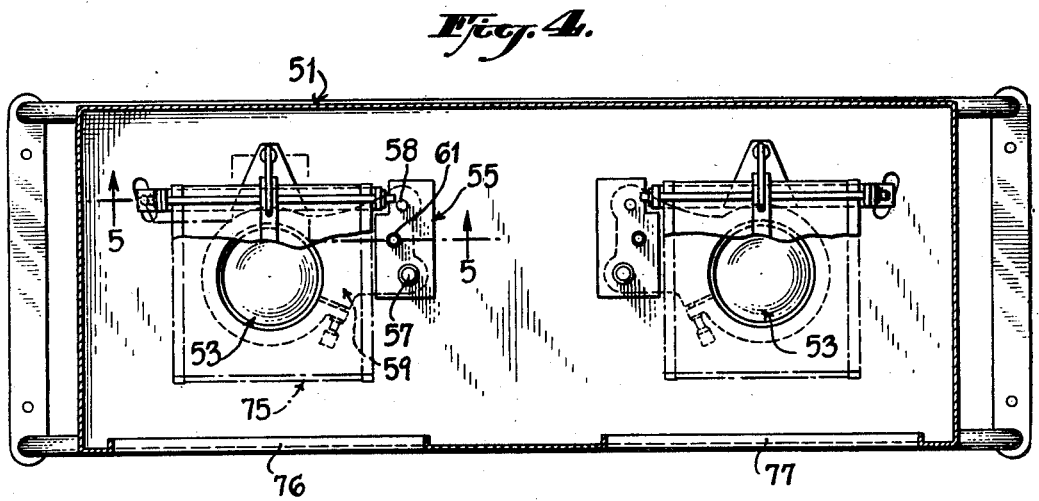
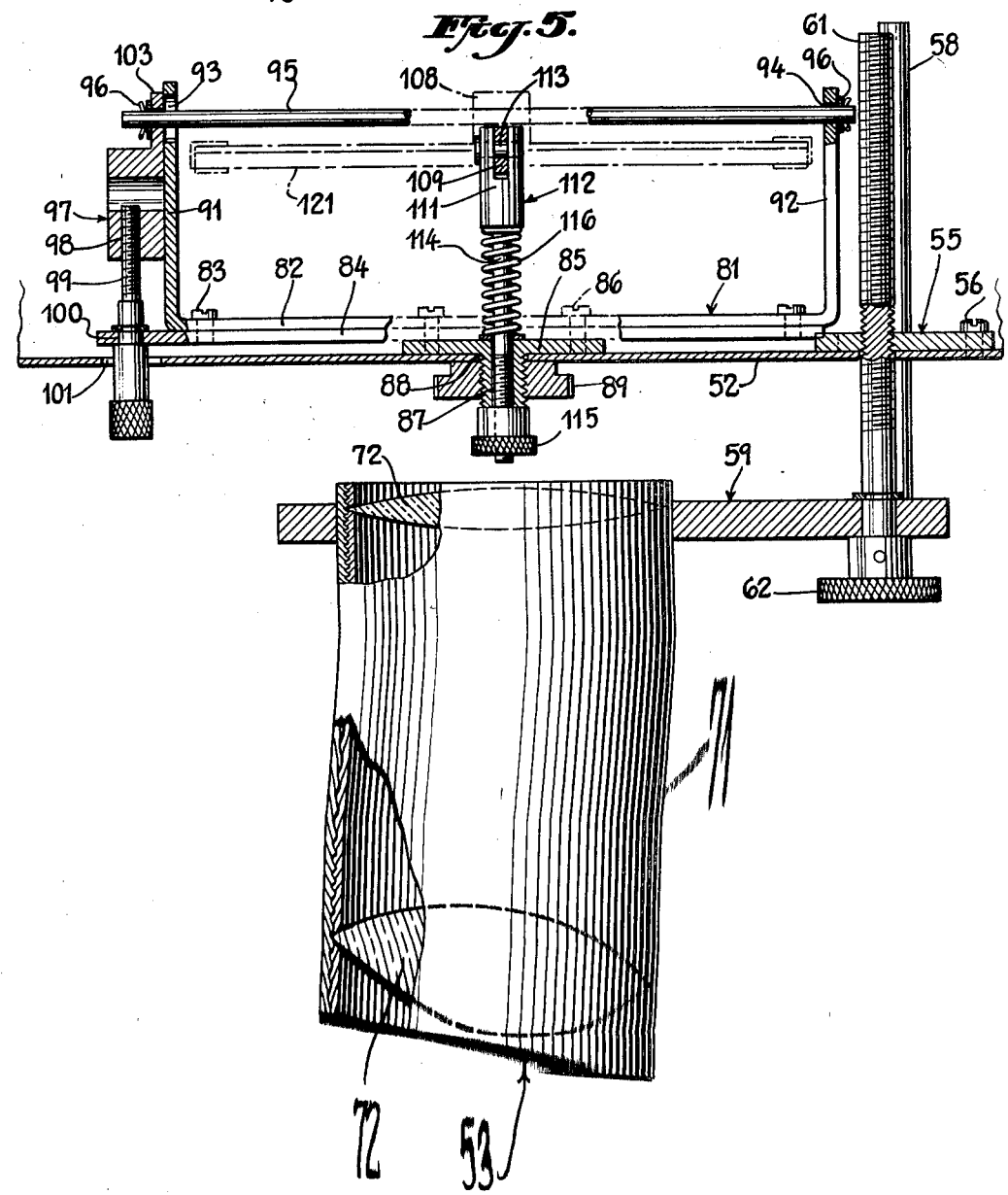

United States Patent Office 2,944,461
Patented July 12, 1960

2,944,461
PROJECTION EQUIPMENT

Thomas B. Howell, 1815 Palmer Ave., Larchmont, and Milton Rogin, 924 Woodmere Drive, North Woodmere, N.Y.

Filed Feb. 18, 1957, Ser. No. 640,808

3 Claims. (Cl. 88—24)

This invention relates to the art of projection equipment, more particularly of the type to provide unique visual effects for television transmission.

In order to achieve versatility in television transmission, it is desirable that a wide range of visual effects be provided. Thus, in many types of programs, especially weather shows, news programs, sports, commercials and in titling a program and in giving credits, it may be desired to project a single or composite image; to have a lap dissolve in which one image is gradually dissolved as another is made to appear, to have an iris dissolve of one image as another gradually appears; to have an instantaneous cut from one image to another; to have a moving title appear on a screen and so forth.

Where such effects require the services of many personnel for the use of complicated electronic equipment that requires well trained personnel for operation, not only is the cost of program presentation high, but the initial cost of the equipment may be prohibitive in the case of small stations. In addition where such effects require the use of a plurality of mirrors, the resultant loss of light transfer and distortion due to multiple reflection impairs the clarity of the resultant projected image.

It is accordingly among the objects of the invention to provide a neat, compact, sturdy and relatively low cost projection equipment having but few relatively simple parts which may readily be assembled and are not likely to become out of order and which may readily be operated after but a short period of instruction to produce the desired visual effects above enumerated and which utilizes a minimum of mirrors, thereby providing for maximum transfer of light and a minimum of distortion in the projected image.

According to the invention, the light from each of a pair of spaced projectors, after it passes through an associated transparency, is reflected from an associated mirror and combined so that a composite image substantially free of distortion is produced of the subject matter on such transparencies. Each projector has a separate control to regulate the intensity of the light therefrom and an adjustable iris is also associated with each projector to control the diameter or width of the beam of light.

In addition, a device is also provided which may be mounted over the output of the projectors and which will cause progressive movement of a transparent strip past such light output for projection of a moving image on a screen.

Figure 2:
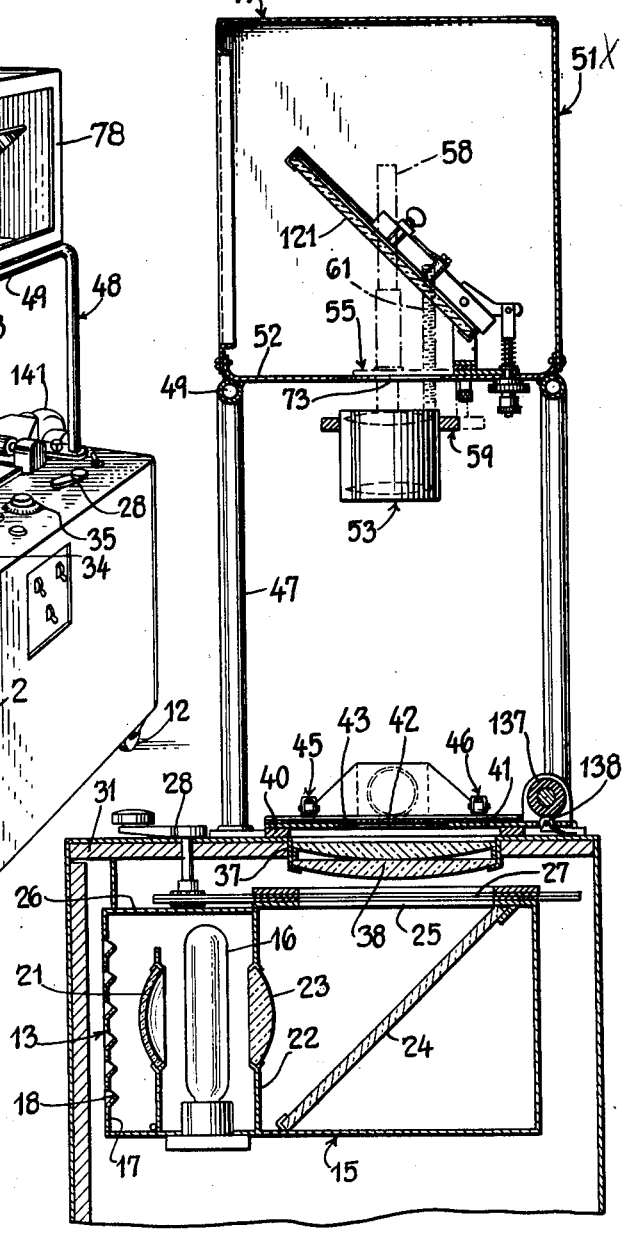
Figure 3:
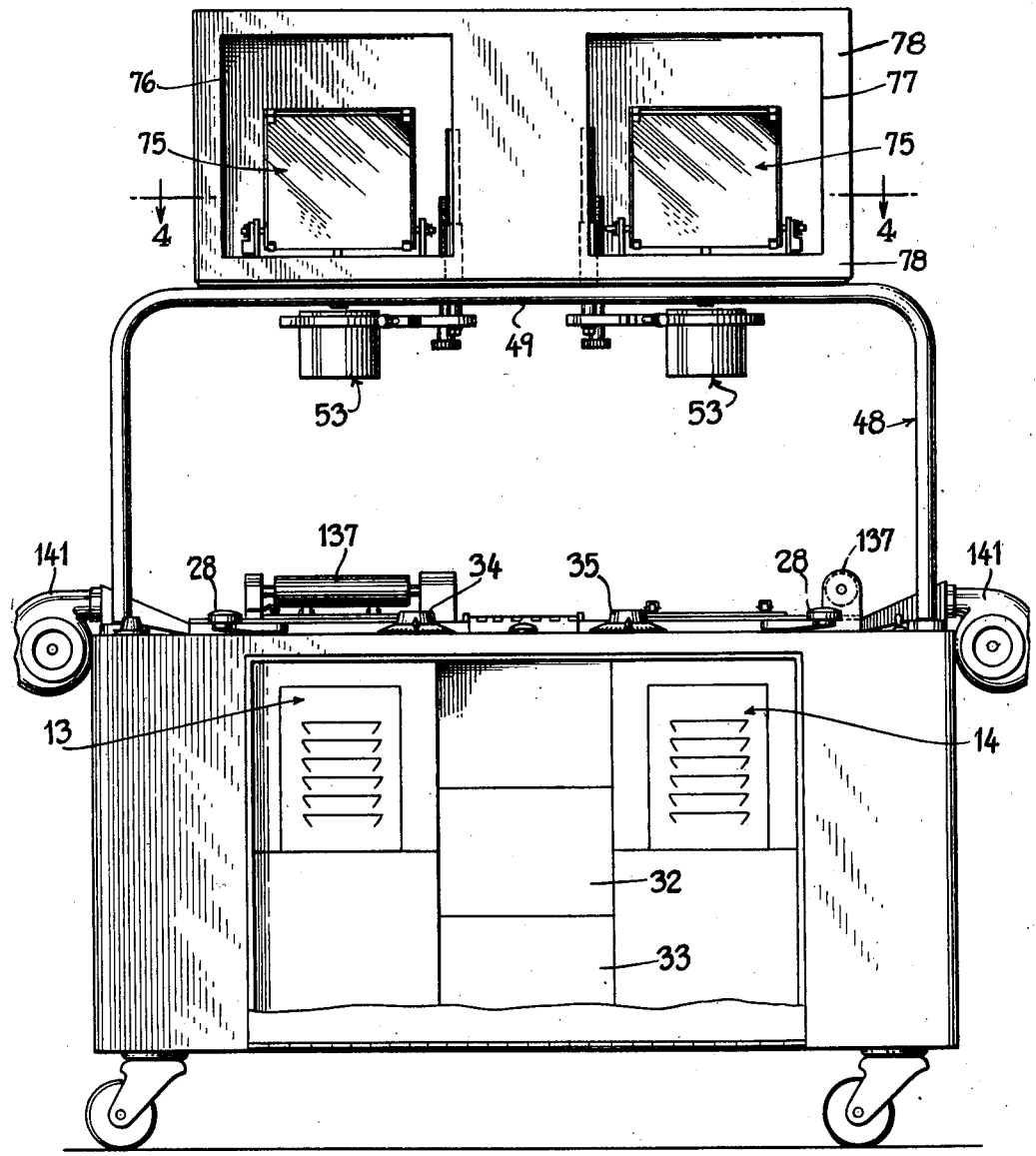
Figure 1:
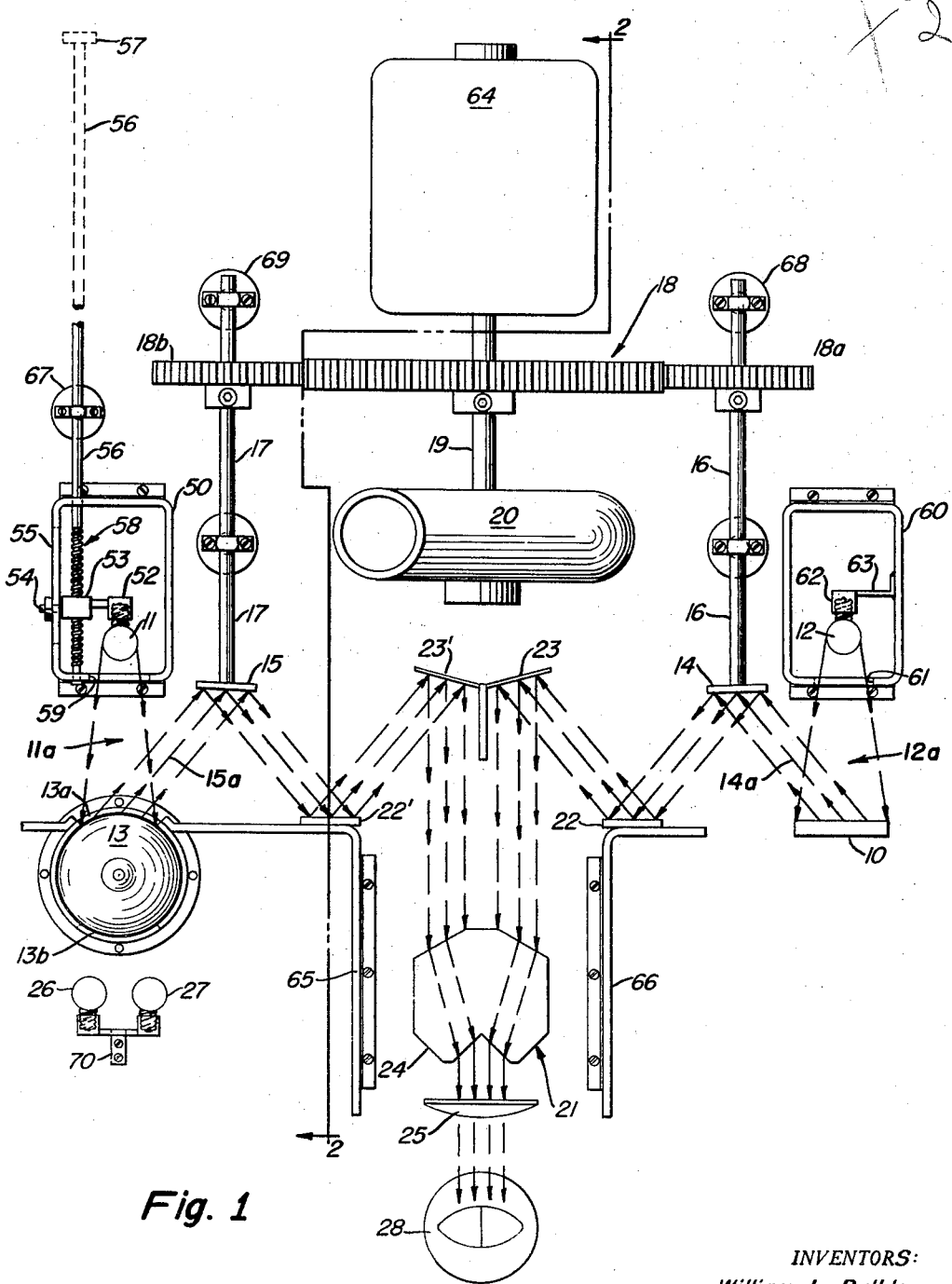

In the accompanying drawings in which is shown one or more of various possible embodiments of the several features of the invention, Fig. 1 is a perspective view of the projection equipment, Fig. 2 is a sectional view taken along line 2—2 of Fig. 1, Fig. 3 is a front elevational view of the equipment, Fig. 4 is a sectional view taken along line 4—4 of Fig. 3, Fig. 5 is a view similar to Fig. 4 taken along line 5—5 of Fig. 4, Fig. 6 is a perspective view with parts broken away of the reflecting mirror, and Fig. 7 is a diagrammatic view illustrating the operation of the equipment according to one application thereof.

Referring now to the drawings, the projection equipment desirably comprises a substantially rectangular hollow base 11, preferably mounted on suitable casters 12 for ease in moving. Positioned in the base 11 are a plurality of light projectors, illustratively two in number and designated 13 and 14 respectively. Each of the projectors, clearly shown in Fig. 2, comprises a substantially rectangular container 15 having a lamp 16 near the front wall 17 thereof, the latter being provided with ventilating louvres 18.

Positioned in container 15 on one side of the lamp adjacent wall 17 is a vertical reflecting mirror 21 and positioned on the opposite side of the lamp, supported by suitable brackets 22 mounted in the container 15, is a vertical lens 23. The container 15 desirably has a mirror 24 therein against which the light from the lamp 16 will be projected. The mirror is inclined rearwardly at such an angle that the light projected thereagainst will be reflected upwardly through an opening 25 in the top wall 26 of container 15 and through an adjustable iris 27 mounted on top wall 26 above opening 25. The iris 27 is controlled by means of a handle 28 positioned on the outer surface of the top wall 31 of the base, as is clearly shown in Fig. 2.

In order to control the intensity of the light emitted by each of the lamps 16, a suitable electrical control is provided. To this end, as is clearly shown in Fig. 3, a pair of variable transformers 32 and 33, commonly known as "Variacs" to adjust the voltage applied to the lamps, are centrally positioned in the base 11. Each of the "Variacs" has an associated vertical shaft (not shown) which rise through the top wall 31 of the base and has an associated knob 34 and 35 at its upper end. Thus, the "Variacs" may be operated independently of each other, so that upon rotation, the intensity of the light from one of the lamps may be reduced and the intensity of the light from the other lamp may be increased or vice versa, thereby providing a gradual and uniform fadeout or lap dissolve from one image to the other.

As shown in Fig. 2, the top wall 31 has an opening 37 over each of the irises 27 and a lens system 38 is mounted in each of said openings 37 so that the light from the lamp 16 reflected from mirror 24 will be projected upwardly therethrough.

Mounted on top wall 31 over each of the openings 37 therein and spaced from said top wall as by spacer blocks 40 is a rigid supporting plate 41 which has an opening 42 aligned with the opening 37. Positioned on each of the supporting plates 41 is a rectangular transparent plate 43 desirably of glass on which a suitable transparency 44 may be positioned. Means are provided releasably to retain the transparencies in fixed position on the transparent plates 43. To this end, a plurality of resilient clamps 45 in the form of leaf springs are provided having one end suitably affixed with respect to the top wall 31 and its other end mounting a roller 46 under which the edge of the transparency may be positioned securely to retain the latter in fixed position on the transparent plate so that light may be projected therethrough without likelihood of movement of the transparency.

Rising from the base 11 at each end of its top wall 31 are the vertical legs 47 of U-shaped frames 48. Mounted on the parallel cross pieces 49 of frames 48 is a rectangular casing 51 from the floor 52 of which depends a by means of the handles 28 will produce other desirable effects.

The equipment above described is also readily adaptable for the projection of a moving title upon a screen for pickup by a television camera in conventional manner. To this end, each of the plates 43 has a driven roller 137 with an associated idler roller 138. Thus, when a strip transparency (not shown) having titles and printing thereon is positioned between the rollers 137, 138 and the roller 137 energized, the transparency will slowly move across the associated plate 43 either from side to side if the plate on the right (Fig. 1) is used, or from front to back, for example, if the plate on the left is used.

In order to prevent injury to the transparencies, a blower 141 may be associated with each of the plates 43 to discharge cool air upon the transparency to prevent overheating thereof.

The numerous visual effects which may be produced with the equipment above described by simple manipulations thereof, add considerably to the attractiveness and interest of television programs and as the equipment utilizes substantially conventional parts which are easy to assemble and not likely to become out of order, such equipment is of relatively low cost and requires a minimum of maintenance.

Although the equipment has been described with respect to its application in the television industry, it is of course to be understood that it can be used for sales promotion work or the like.

As many changes could be made in the above equipment, and many apparently widely different embodiments of this invention could be made without departing from the scope of the claims, it is intended that all matter contained in the above description or shown in the accompanying drawings shall be interpreted as illustrative and not in a limiting sense.

Having thus described our invention, what we claim as new and desire to secure by Letters Patent of the United States is:

1. A composite optical image projecting apparatus comprising a base, a pair of spaced lenses supported by said base, a pair of light projectors supported by said base beneath said lenses to project light therethrough, a support positioned above said lenses, having a floor having a pair of spaced lens openings, a second pair of spaced lenses mounted on said support and positioned respectively over said first pair of lenses, beneath said lens openings, a pair of mirrors mounted on said support and positioned respectively over said second pair of lenses, each of said mirrors being inclined so as to reflect the light projected from the associated lens of said second pair outwardly from the support in substantially the same direction, means mounting each of said mirrors on said support for substantially universal movement, said mirror mounting means comprising a substantially U-shaped bracket associated with each of said lens openings, each of said brackets having a cross piece and a pair of upstanding legs, a plate centrally located on said cross piece and affixed thereto extending laterally therefrom, said floor having an aperture positioned respectively to the rear of each of said lens openings, a vertical member extends through each of said apertures and through said plates, means to lock each of said plates in fixed position with respect to said floor to prevent rotation of its bracket about said associated vertical member, a rod extending through each of the legs of said bracket in substantially a horizontal plane, means to mount said mirrors on said rods, means operatively connecting said rods to said vertical members, means to effect vertical movement of said vertical members to adjust the angle of inclination of said mirrors, each of said brackets having a portion extending longitudinally therefrom beyond one of said legs, a member positioned in juxtaposition to said leg, each of said legs having an elongated slot through which the rod extends and said member having an opening through which the rod extends, said floor having an opening beneath said longitudinally extending portion, a vertical screw rotatably mounted on said extending portion restrained from vertical movement with respect thereto, said screw having its lower end extending through said last named opening and its upper end threaded into said slidable member, whereby upon rotation of said screw, said member may be raised or lowered to tilt said rod with respect to said bracket.

2. The combination recited in claim 1 in which each of said plates has a threaded nipple extending through the associated opening to the rear of the lens opening, a nut screwed on said nipple to clamp said plate in fixed position on said floor of the support, said vertical member comprises a pin extending through said nipple and threaded at its lower end, a nut screwed on the threaded end of said pin projecting beyond said nipple, said pin having a stop member adjacent its upper end, a coil spring encompasses said pin between said stop member and said plate normally to urge said pin upwardly, said rod being operatively connected to the upper end of said pin.

3. The combination recited in claim 1 in which each of said mirrors comprises a supporting frame having a rear wall, a bar secured to said rear wall and extends beyond the lower edge thereof, said rod extending through said bar adjacent its lower end pivotally to mount the mirror on said rod and means pivotally connecting the rear end of said bar to the upper end of said vertical member.

References Cited in the file of this patent
UNITED STATES PATENTS

| | | |
|---|---|---|
| 1,857,135 | Brenkert et al. | May 10, 1932 |
| 1,900,557 | Holcombe | Mar. 7, 1933 |
| 2,027,026 | Dirkes et al. | Jan. 7, 1936 |
| 2,660,087 | Domeshek | Nov. 24, 1953 |
| 2,754,722 | Howell et al. | July 19, 1956 |

INVENTORS:
William L. Bulkley
John Robert Krebs